United States Patent
Wang et al.

(10) Patent No.: US 10,628,911 B2
(45) Date of Patent: Apr. 21, 2020

(54) COMPUTER SYSTEM, GRAPHICS PROCESSING UNIT, AND GRAPHICS PROCESSING METHOD THEREOF THAT ARE CAPABLE OF SWITCHING DIFFERENT RENDERING MODES

(71) Applicant: Shanghai Zhaoxin Semiconductor Co., Ltd., Shanghai (CN)

(72) Inventors: Ying Wang, Shanghai (CN); Fengxia Wu, Shanghai (CN); Deming Gu, Shanghai (CN); Yi Zhou, Shanghai (CN); Jiakuan Hu, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 16/249,085

(22) Filed: Jan. 16, 2019

(65) Prior Publication Data
US 2020/0082493 A1 Mar. 12, 2020

(30) Foreign Application Priority Data
Sep. 7, 2018 (CN) .......................... 2018 1 1042673

(51) Int. Cl.
*G06T 1/20* (2006.01)
(52) U.S. Cl.
CPC ...................... *G06T 1/20* (2013.01)
(58) Field of Classification Search
CPC ....................................................... G06T 1/20
USPC ........................................ 345/501, 506, 522
See application file for complete search history.

(56) References Cited

U.S. PATENT DOCUMENTS

| | | | |
|---|---|---|---|
| 2012/0293519 A1* | 11/2012 | Ribble ................. | G06T 15/005 345/501 |
| 2013/0135341 A1* | 5/2013 | Seetharamaiah ..... | G06T 15/005 345/619 |
| 2015/0302546 A1 | 10/2015 | Balci et al. | |
| 2017/0116701 A1 | 4/2017 | Acharya et al. | |

* cited by examiner

*Primary Examiner* — Jacinta M Crawford
(74) *Attorney, Agent, or Firm* — McClure, Qualey & Rodack, LLP

(57) ABSTRACT

A graphics processing unit (GPU) is provided. The GPU includes a command stream parser (CSP) including a profiling unit used to provide performance statistics data for the GPU to determine a rendering mode of the GPU, wherein the rendering mode includes a first rendering mode and a second rendering mode for performing a graphics rendering pipeline for graphics processing. The profiling unit calculates drawing time of frames and the number of objects in the frames when the GPU operates in the first rendering mode, and determines whether the operation of the GPU is switched to the second rendering mode according to the calculated drawing time and the number of objects; when determining that the calculated drawing time and the number of objects are less than their respective thresholds, the CSP causes the operation of the GPU to switch from the first rendering mode to the second rendering mode.

9 Claims, 5 Drawing Sheets

COMPUTER SYSTEM, GRAPHICS PROCESSING UNIT, AND GRAPHICS PROCESSING METHOD THEREOF THAT ARE CAPABLE OF SWITCHING DIFFERENT RENDERING MODES

CROSS REFERENCE TO RELATED APPLICATIONS

This application claims priority to Chinese Patent Application No. 201811042673.8 filed on Sep. 7, 2018 in the China Intellectual Property Office, the contents of which are incorporated by reference herein. The present application also includes subject matter that is related to co-pending application Ser. No. 16/249,073, filed Jan. 16, 2019.

BACKGROUND OF THE INVENTION

Field of the Invention

Aspects of the present invention relate generally to a graphics processing unit, and more particularly, to a computer system, a graphics processing unit, and a graphics processing method thereof that are capable of switching different rendering modes to reduce power consumption.

Description of the Related Art

A graphics processing unit (GPU) is a fairly important operational component. In general, the power consumption of the GPU is very high, so it is necessary to minimize the power consumption to extend the use time of the electronic device. The command stream parser used in current GPUs will only use a single rendering mode, so that each stage in the graphics rendering pipeline needs to render each primitive one by one. For some temporary data of pixels, such as color/depth/stencil data, when the space of the built-in buffer or cache memory on the graphics processing chip is insufficient to store the temporary data of pixels, the temporary data of pixels needs to be written to the memory and then read back when rendering subsequent primitives to perform operations of the subsequent graphics rendering pipeline such as blend/depth testing/stencil testing. However, when the temporary data of pixels written to the memory would be replaced by data of pixels in subsequent primitives, the write/read operations may waste memory access resources. It results in high power consumption and additional cost.

In addition, since the rendering result of the subsequent primitive may be affected by the current primitive, each processing stage in the graphics rendering pipeline in the GPU with the conventional CSP only can process a single primitive at a time, resulting the graphics processing performance is not good. Therefore, a graphics processing unit and a graphics processing method thereof capable of supporting high performance requirements and reducing power consumption are provided in the present invention to solve the disadvantages.

BRIEF SUMMARY OF THE INVENTION

In a preferred embodiment, the invention is directed to a graphics processing unit (GPU). The GPU comprises a command stream parser (CSP) including a profiling unit used to provide performance statistics data for the GPU to determine a rendering mode of the GPU, wherein the rendering mode includes a first rendering mode and a second rendering mode for performing a graphics rendering pipeline for graphics processing. The profiling unit of the CSP calculates drawing time of a plurality of consecutive frames and the number of graphics objects in the consecutive frames for a specific application when the GPU operates in the first rendering mode, and determines whether the operation of the GPU is switched to the second rendering mode according to the calculated drawing time of the frames and the number of graphics objects in the frames; when determining that the calculated drawing time of the frames and the number of graphics objects in the frames are less than their respective thresholds, the CSP causes the operation of the GPU to switch from the first rendering mode to the second rendering mode.

In a preferred embodiment, the invention is directed to a graphics processing method, used in a graphics processing unit (GPU), wherein the GPU comprises a command stream parser (CSP) having a profiling unit, and the GPU supporting a first rendering mode and a second rendering mode performs a graphics rendering pipeline for graphics processing. The method comprises: operating the GPU to be run in the first rendering mode; calculating drawing time of a plurality of consecutive frames and the number of graphics objects in the consecutive frames of a specific application by the profiling unit; and determining whether an operation of the GPU is switched to the second rendering mode according to the calculated drawing time of the frames and the number of graphics objects in the frames, wherein when determining that the calculated drawing time of the frames and the number of graphics objects in the frames are less than their respective thresholds, the operation of the GPU is switched from the first rendering mode to the second rendering mode.

In a preferred embodiment, the invention is directed to a computer system. The computer system comprises a central processing unit (CPU) and a graphics processing unit (GPU). The CPU executes a display driver. The GPU performs a graphics rendering pipeline through a first rendering mode and a second rendering mode and at least comprises a command stream parser (CSP). The CSP includes a profiling unit used to provide performance statistics data for the GPU to determine a rendering mode of the GPU. The profiling unit of the CSP calculates drawing time of a plurality of consecutive frames and the number of graphics objects in the consecutive frames of a specific application when the GPU operates in the first rendering mode, and determines whether the operation of the GPU is switched to the second rendering mode according to the calculated drawing time of the frames and the number of graphics objects in the frames; when determining that the calculated drawing time of the frames and the number of graphics objects in the frames are less than their respective thresholds, the CSP triggers the operation of the GPU to switch from the first rendering mode to the second rendering mode. The profiling unit of the CSP calculates a memory flow of the consecutive frames after the operation of the GPU is switched from the first rendering mode to the second rendering mode; when a difference between the memory flow and a previous memory flow is greater than a predetermined threshold, the CSP maintains that the GPU operates in the second rendering mode; and when the difference between the memory flow and the previous memory flow is not greater than the predetermined threshold, the CSP switches to the first rendering mode from the second rendering mode if the GPU operates in the second rendering mode.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
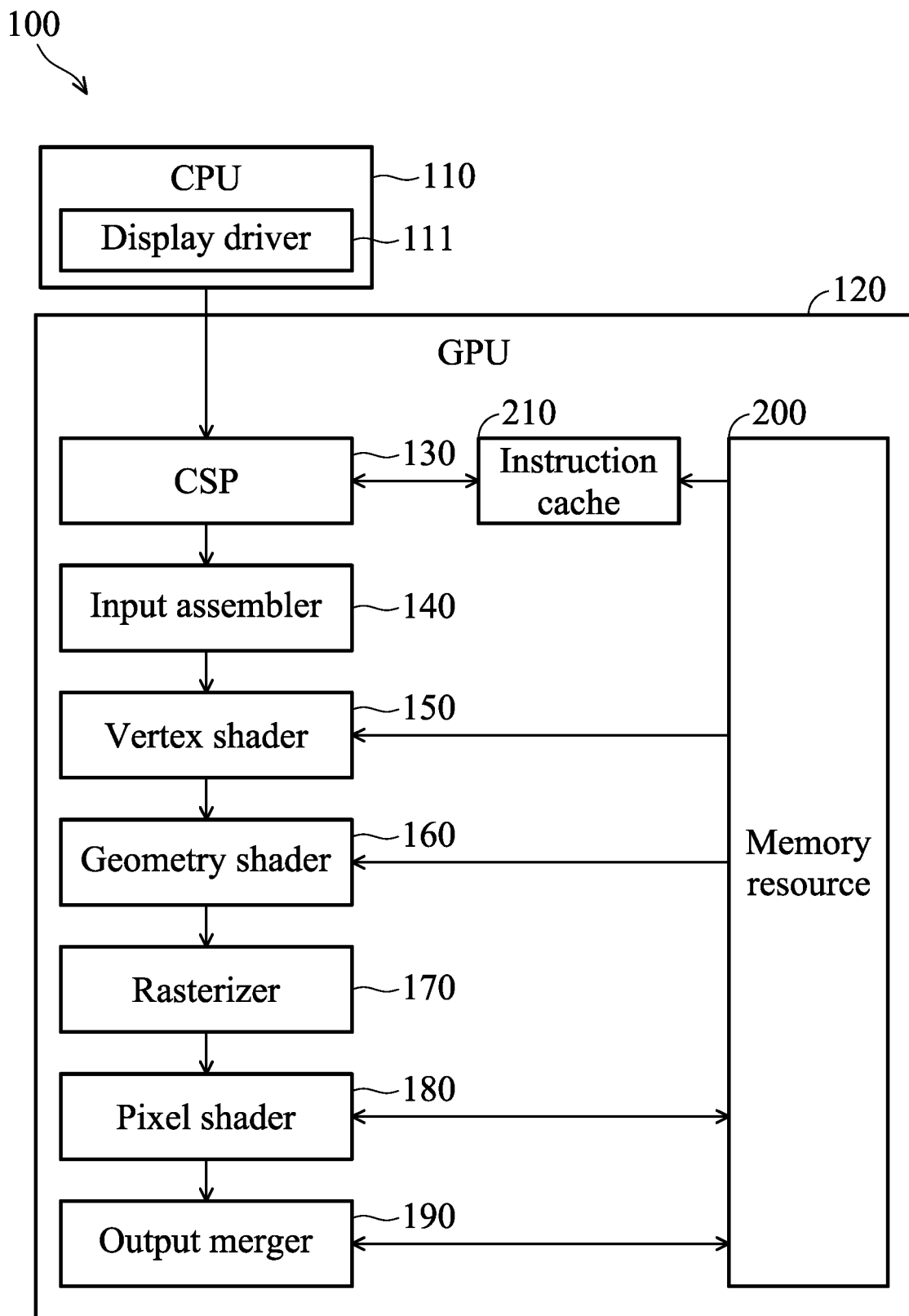
FIG. 1 is a block diagram illustrating a computer system according to one embodiment of the present invention.

FIG. 1 is a block diagram illustrating a computer system according to one embodiment of the present invention. As shown in FIG. 1, the computer system 100 comprises a central processing unit (CPU) 110 and a graphics processing unit (GPU) 120, wherein the display driver 111 executed by the GPU 120 and the CPU 110 can support, for example, the OpenGL ES standard. The GPU 120 includes a command stream parser (CSP) 130, an input assembler 140, a vertex shader 150, a geometry shader 160, and a rasterizer 170, a pixel shader 180, an output merger 190, a memory resource 200, and an instruction cache 210, wherein the input assembler 140, the vertex shader 150, the geometry shader 160, the rasterizer 170, the pixel shader 180, and the output merger 190 are also referred as processing stages of a graphics rendering pipeline and compose together a graphics rendering pipeline. The CSP 130 in the GPU 120 receives drawing commands from the display driver 111 executed by the CPU 110 of the computer system 100. The CSP 130 transmits the drawing commands directly to subsequent processing stages 140~190 for processing various operations of the graphics rendering pipeline, such as rasterization, depth test, stencil test, and so on. In another embodiment, the CSP 130 and the input assembler 140 can be integrated into a single CSP. It should be understood that the components within the graphics rendering pipeline may vary from system to system and may be presented in a variety of different manners, and it should not be limited in the invention. The composition of the graphics rendering pipeline in FIG. 1 is well known to those skilled in the art, so only a simplified description is given below and the details related to the graphics rendering pipeline will be omitted.

The CSP 130 reads command data from the memory resource 200 and performs command parsing, wherein the memory resource 200 may be a virtual memory or memories of the GPU 120 and the computer system 100. Then, the CSP 130 inputs relevant command parameters of the drawing commands to the input assembler 140. The input assembler 140 receives the relevant command parameters, obtains index values and vertex stream data, and combines and transmits the index values and the vertex stream data to the vertex shader 150 and the geometry shader 160. The index value and the vertex stream data contain actual geometric data, such as vertex identifier (vertex ID), primitive ID and instance ID, etc., which can be used to adjust procedures or source data by each processing stage of the graphics rendering pipeline. The input assembler 140 uses different forms of primitives, such as line lists and triangle strips, to construct actual triangles. The vertex shader 150 processes vertex data and uses the vertex data to construct triangles and polygons of an object to be displayed to perform operations such as transformation, skinning, lighting and so on. The geometry shader 160 may receive vertices processed through the transformation, skinning, and lighting, and generates new vertex data after processing. The drawing data after the shading processing described above is transmitted to the rasterizer 170 for rasterization. The rasterizer 170 performs perspective divide, clipping, and viewport/scissor selection and implementation, and produces color information of all pixels of the outputted primitives to the pixel shader 180 to provide an early visibility test. The pixel shader 180 can perform pixel shading on the rasterized drawing data, processes each pixel and changes the color value of each pixel according to various color characteristics (for example, functions of a reflection value or a mirrored color value and a transparent value may be determined according to the position of the light source and the normal vector of the vertex), and outputs the result after color processing to the output merger 190. The output merger 190 is a fixed function unit, and is also generally the final stage in the graphics rendering pipeline process, wherein the function of the output merger 190 is to take all of the results generated by the graphics rendering pipeline process and merge the results into the final pixel value that are seen on the screen. The output merger 190 may use stencil values, depth values along with multiple rendering targets along with various blending functions to create a rendering target to be displayed. The display data after the blending process can be further written into a display memory by a cache memory (not shown in FIG. 1) via a memory access unit (not shown in FIG. 1).

In the architecture of the GPU 120 in FIG. 1, the CSP 130 of the present invention, which is different from the traditional CSP only operating in a single rendering mode, may operate in two different rendering modes, that is, the first rendering mode and the second rendering mode. Specifically, the first rendering mode may be an immediate rendering mode (IMR mode), while the second rendering mode may be a tile rendering mode (TBR mode). In the immediate rendering mode, the GPU 120 renders the entire rendering target in units of primitives. In the tile rendering mode, the CSP 130 may divide the entire rendering target into a plurality of tiles, and then may render the rendering target in units of tiles, wherein the size and pixel coordinates of the tiles are predefined. In the tile rendering mode, each of the processing stages 140~190 in the three-dimensional graphics rendering pipeline of the GPU 120 renders the predefined tiles and uses a scissor (not shown in FIG. 1) to indicates related information of a current tile, such as the size of the tile, the coordinates in the entire rendering target, etc., wherein the related information of the current tile is provided for each of the processing stages 140~190 to perform the rendering operations described above. For example, the size of the tile can be 8×8, 16×16 pixels, and the like. Alternatively, the CSP 130 may also transmit a control signal to the CPU 110 to indicate that a rendering mode which is more suitable for the current application.

Figure 2:
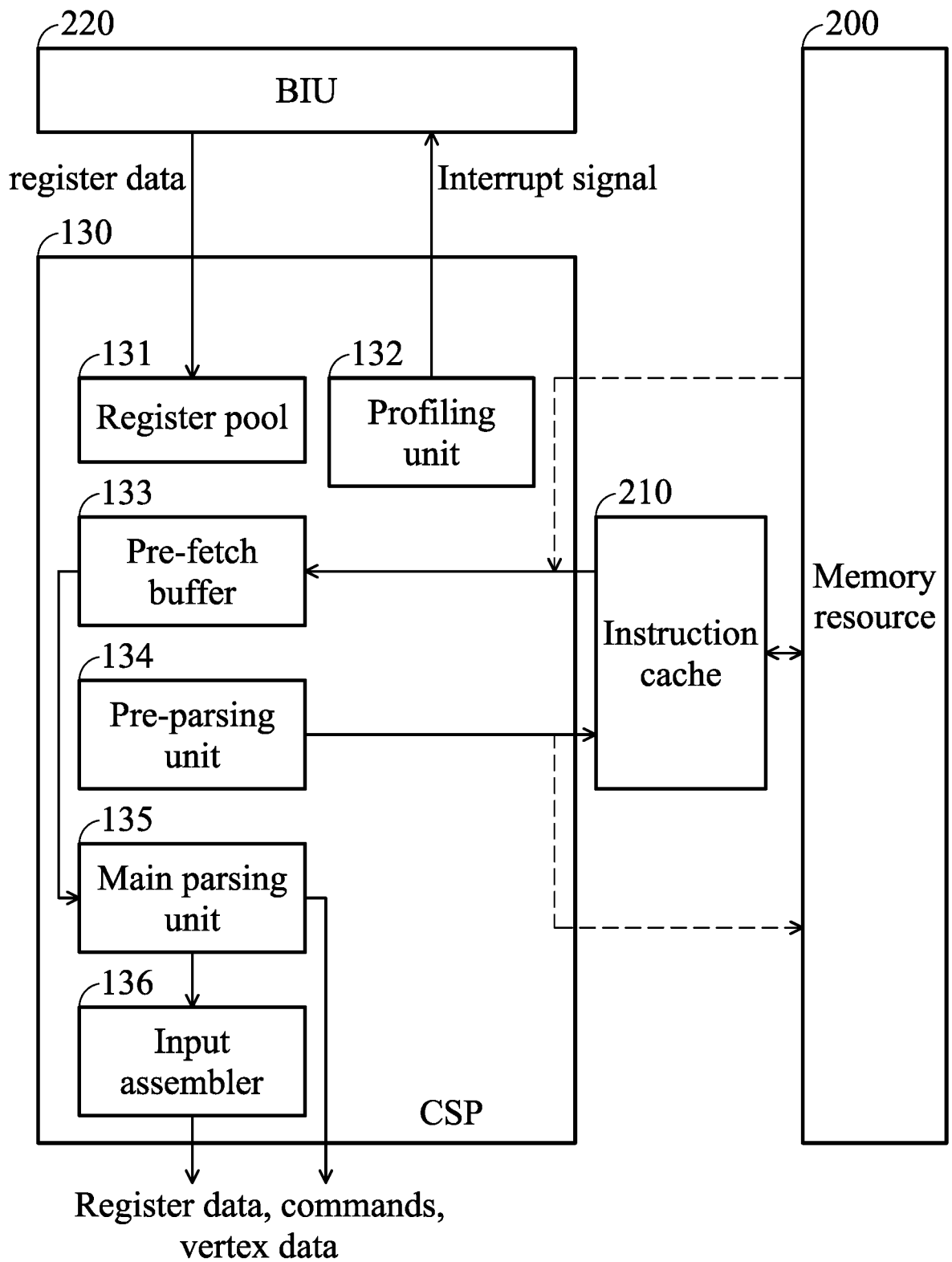
FIG. 2 is a block diagram illustrating the CSP according to one embodiment of the present invention.

FIG. 2 is a block diagram illustrating the CSP 130 according to one embodiment of the present invention. The CSP 130 comprises at least a register pool 131, a profiling unit 132, a pre-fetch buffer 133, a pre-parsing unit 134, a main parsing unit 135, and an input assembler 136. The CSP 130 is also coupled to the bus interface unit (BIU) 220 and is coupled to the memory resource 200 via the instruction cache 210.

Figure 5:
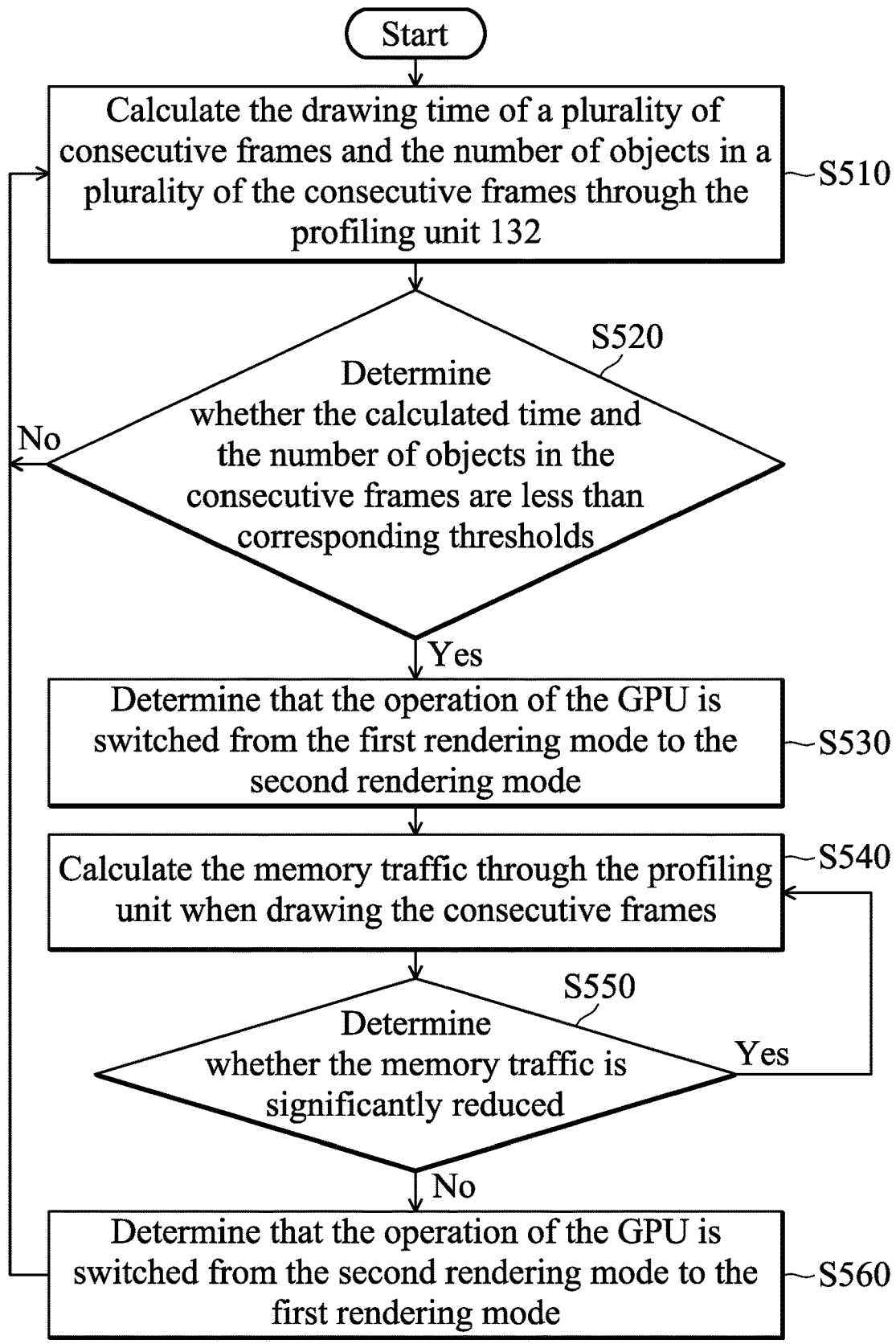
FIG. 5 is a flow chart illustrating a graphics processing method according to another embodiment of the present invention.

The register pool 131 stores related register data for the CSP 130 sent by the BIU 220. The profiling unit 132 performs performance analysis on the graphics processing of the GPU, generates performance analysis results, and sends a control signal, such as an interrupt signal, to the CPU 110 via the BIU 220 according to the performance analysis results to instruct the CPU 110 to switch the rendering mode of the GPU 120 in the FIG. 1. A plurality of counters are defined in the profiling unit 132 for counting graphics processing performances of the processing stages 140~190 of the GPU 120 of FIG. 1. In an embodiment, the statistics includes the time required for drawing a frame. In another embodiment, the statistics includes the number of all objects drawn in a frame. In yet another embodiment, the statistics includes statistical memory traffic, and so on, wherein the statistical memory traffic is the number of reads and writes in the memory. The profiling unit 132 can perform statistical analysis on various types of applications and establish a threshold corresponding to each counter in advance. The profiling unit 132 or the graphics driver (not shown in FIG. 2) can query and calculate statistics data of the performance analysis (such as a drawing time and the number of objects in consecutive frames of a specific application) by specific commands, and transmits a command of the suitable rendering mode to the CPU 110 of FIG. 1 according to the statistics data. The CPU 110 instructs the GPU 120 to flexibly switch the rendering mode according to the command. That is, for each application, the CSP 130 can provide hints for suitable rendering modes to the CPU 110 according to various performance analysis results provided by the profiling unit 132, and the CPU 110 can switch the rendering mode used by the GPU 120 according to the hints provided from the CSP 130 such that the CSP 130 may switch to the corresponding rendering mode. The details of switching the rendering modes are shown in the description of FIG. 5.

The pre-fetch buffer 133 is used to buffer a small amount of commands and indirect data used for the pre-parsing unit 134 and the main parsing unit 135. When the rendering mode is the first rendering mode, the pre-fetch buffer 133 directly sends a read request to the memory resource 200 to fetch the data back from the memory resource 200 to the pre-fetch buffer 133 directly. When the rendering mode is the second rendering mode, the pre-fetch buffer 133 accesses the read request from the memory resource 200 and fetches the data via the instruction cache 210.

The pre-parsing unit 134 is used to pre-parse all the commands in a command list to parse the indirect data included in the commands and perform pre-fetching of the indirect data. The main parsing unit 135 is used to perform complete parsing on each command, and send the parsed data to each corresponding unit subsequent to the graphics rendering pipeline, such as the input assembler 140, the vertex shader 150 in the FIG. 1, and so on. It should be noted that, in some embodiments, the pre-parsing unit 134 and the main parsing unit 135 may also be integrated into a single parsing unit. The input assembler 136 can combine the vertex data into several different primitive types and outputs the data (such as register data, commands, vertex data, etc.) to subsequent processing stages 140~190 of the graphics rendering pipeline.

In addition, in the second rendering mode, since all the commands need to be parsed for each tile, an instruction cache 210 is further configured in the GPU 120 of FIG. 1 in the present invention to store a command list performed for all tiles in each frame and the indirect data of the commands in the command list. In an embodiment, a space may be configured on the original system cache, such as the L2 cache, as the instruction cache 210. The instruction cache 210 is reserved for use of the second rendering mode to speed up the graphics processing. The instruction cache 210 can be further divided into a non-replaceable cache and a replaceable cache. The non-replaceable cache can be further divided into a static data cache and a dynamic data cache. The static data cache is mainly used to store the command list for each tile. The content in the static data cache is fixed after the first allocation is completed. It means that the replacement cannot be performed until all the tiles of the current frame are completed, and the content in the static data cache is unpinned or invalid after the rendering of the current frame is completed. The dynamic data cache is mainly used to store the indirect data for each command. The indirect data is data that cannot be directly obtained from the command list, such as commands that use indirect addresses. Since the indirect data may be updated by the CPU 110, the indirect data should be updated synchronously to the instruction cache 210 when the indirect data is updated. A cache invalidation command can be used in the GPU 120 to achieve synchronization. When the CSP 130 needs to read the data from the dynamic data cache again after the invalidation, the dynamic data cache may load the data from the memory resource 200 and then transmits the data back to the CSP 130.

The replaceable cache is configured with a spare space, and the available space in the replaceable cache can be used by a static data cache and a dynamic data cache freely. Since the sizes of the command lists and the indirect data between each frame of each application may be different, the size of the space configured in the non-replaceable cache may not be sufficient for processing some frames. Therefore, the CSP 130 can store/configure data beyond the portion of the non-replaceable cache in the spare space of the replaceable cache.

Figure 3:
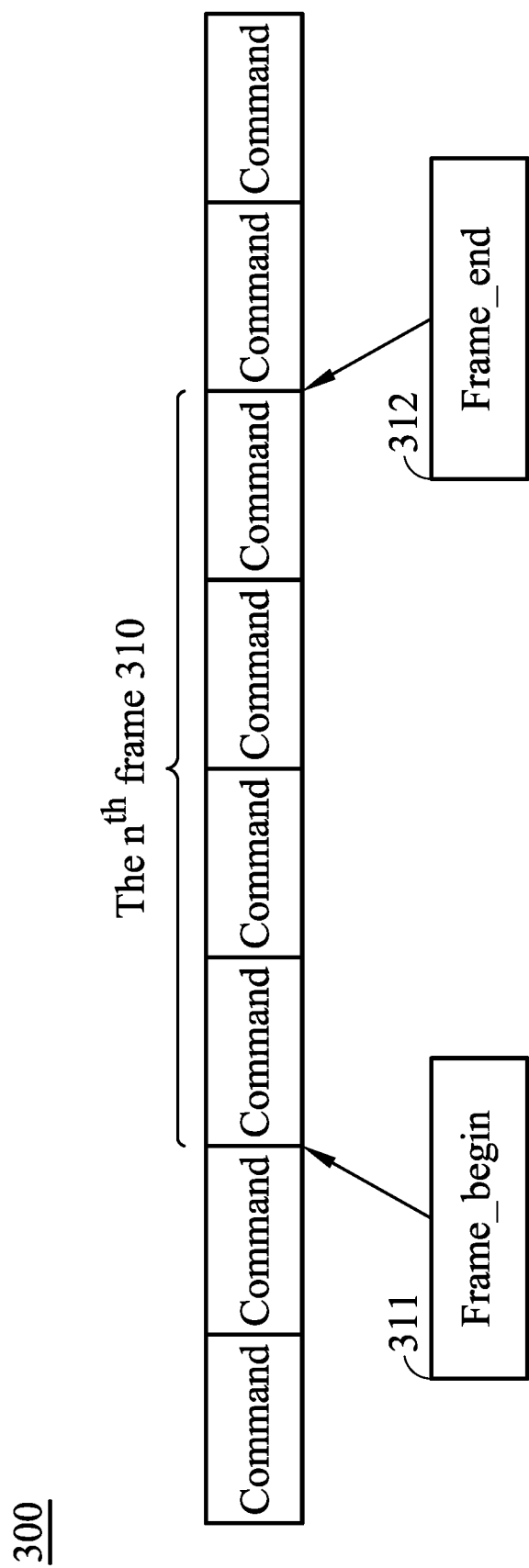
FIG. 3 is a schematic diagram illustrating a command list according to one embodiment of the present invention.

Specifically, the display driver 111 executed by the CPU 110 determines whether the rendering mode of the GPU 120 is the second rendering mode. When the display driver 111 determines that the rendering mode of the GPU 120 is the second rendering mode, the display driver 111 executed by the CPU 110 inserts a specific command stream parsing (CSP) command for each frame in the original command list. Specifically, the specific CSP command may include at least a frame-begin instruction command and a frame-end instruction command, wherein the display driver 111 inserts the frame-begin instruction command prior to the start of the command list of each frame, inserts the frame-end instruction command after the end of each frame and transmits the command list of each frame to the GPU 120. FIG. 3 is a schematic diagram illustrating a command list according to one embodiment of the present invention. As shown in FIG.

3, the command list 300 includes a plurality of drawing commands, wherein the command list of the $n^{th}$ frame is 310. The display driver 111 inserts a frame-begin instruction command "Frame_begin"311 prior to the start of the command list of the $n^{th}$ frame 310 and inserts a frame-end instruction command "Frame_end"312 after the end of the frame. Then, the display driver 111 transmits the command list with the frame-begin instruction command "Frame_begin"311 inserted prior to the start of the frame and the frame-end instruction command "Frame_end"312 inserted after the end of the frame to the GPU 120. When the CSP 130 receives the command list including multiple drawing commands from the display driver 111, the CSP 130 parses the command list to obtain and transmit the command list including the frame-begin instruction command "Frame_begin"311 and the frame-end instruction command "Frame_end"312 to the GPU 120. When the CSP 130 receives the command list including multiple drawing commands from the display driver 111 and parses the command list to obtain the specific CSP commands including the frame-begin instruction command "Frame_begin"311 and the frame-end instruction command "Frame_end"312, the CSP 130 stores a set of first commands (e.g., the command list 310 of the $n^{th}$ frame) between the specific CSP commands into the instruction cache 210 to prepare for subsequent execution of graphics processing in the second rendering mode.

Figure 4:
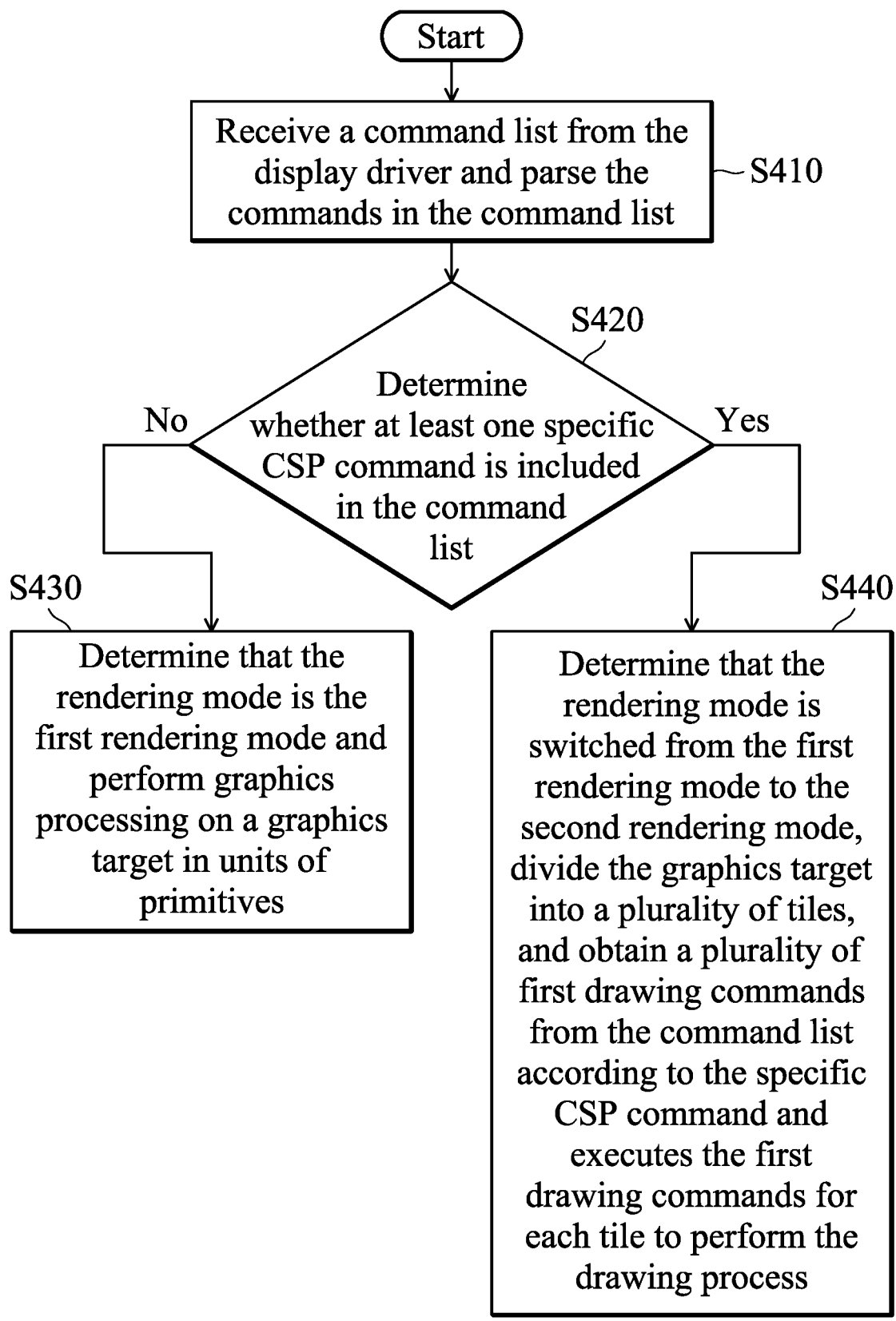
FIG. 4 is a flow chart illustrating a graphics processing method according to an embodiment of the present invention.

FIG. 4 is a flow chart illustrating a graphics processing method according to an embodiment of the present invention. In the embodiment, it is assumed that the GPU 120 initially operates in the first rendering mode, and the first rendering mode is the immediate rendering mode and the second rendering mode is the tile rendering mode.

In step S410, the CSP 130 in the GPU 120 receives a command list from the display driver 111 and parses the commands in the command list. Next, the CSP 130 determines a rendering mode of the GPU 120 according to the command parsing result and executes a graphics rendering pipeline (such as the processing stages 140~190 shown in FIG. 1) in a corresponding rendering mode for graphics processing. Specifically, since the display driver executed by the CPU 110 inserts a specific CSP command (such as the "Frame_begin"311 shown in FIG. 3) for each frame in the original command list when the rendering mode of the GPU 120 is the second rendering mode, the CSP 130 can determine whether at least one specific CSP command is included in the command list to determine the rendering mode operated by the GPU 120.

In step S420, the CSP 130 determines whether at least one specific CSP command is included in the command list received by the GPU 120 from the display driver 111. For example, the specific CSP commands may be the frame-begin instruction command "Frame_begin"311 and the frame-end instruction command "Frame_end"312 shown in FIG. 3, which are used to indicate the positions of the start and the end of the commands of each frame, respectively. When the CSP 130 determines that the specific CSP command is not included in the command list (for example, the frame-begin instruction command "Frame_begin"311 is not included in the command list) (that is, NO in step S420), in step S430, the CSP 130 determines that the rendering mode is the first rendering mode and performs graphics processing on a graphics target in units of primitives.

On the contrary, when the CSP 130 determines that the specific CSP command is included in the command list (for example, the frame-begin instruction command "Frame_begin"311 is included in the command list) (that is, Yes in step S420), in step S440, the CSP 130 determines that the rendering mode is switched from the first rendering mode to the second rendering mode since the GPU 120 initially operates in the first rendering mode, divides the graphics target into a plurality of tiles, and obtains a plurality of first drawing commands from the command list according to the specific CSP command and executes the first drawing commands for each tile to perform the drawing process.

In an embodiment, at least one specific CSP command includes a first specific command and a second specific command, and the CSP 130 fetches a plurality of command between the first specific command and the second specific command in the command list as the first drawing commands. For example, refer to FIG. 3, the first specific command is the frame-begin instruction command "Frame_begin"311 and the second specific command is a frame-end instruction command "Frame_end"312, which are used to indicate the start and end of the commands of each frame, respectively. The CSP 130 may parse multiple commands at a time, sets a set of commands (for example, the command list 310) between the specific CSP commands 311 and 312 in the command list as the first drawing commands, and stores the first drawing commands in the instruction cache 210 for performing subsequent graphics processing in the second rendering mode. In another embodiment, the CSP 130 may parse a command at a time. When the CSP 130 determines that the parsed command is the first specific CSP command 311, the CSP 130 stores the subsequent commands to the instruction cache 210 until the second specific CSP command 312 is parsed, and sets the commands in the instruction cache 210 as the first drawing commands, wherein the instruction cache 210 can be further divided into a non-replaceable cache and a replaceable cache. The non-replaceable cache is used to store a command list corresponding to the first drawing commands, and at least one indirect data corresponding to the first drawing commands. In an embodiment, the non-replaceable cache further includes a static data cache and a dynamic data cache which are used to store the command list corresponding to the first drawing commands and at least one indirect data corresponding to the first drawing commands, respectively. Thereafter, the CSP 130 may fetch the first drawing commands from the instruction cache 210 to perform command parsing for each of the tiles.

In an embodiment, the first specific instruction further includes tile information, and the CSP 130 can determine the number of tiles of each frame and the coordinate position of each of the tiles according to the tile information, so that the subsequent processing stages (for example, the processing stages 140~190 shown in FIG. 1) of the graphics rendering pipeline may generate required data such as vertex data, etc. Specifically, the tile information can provide information about the size of the graphics target (for example, "width" and "height") and information about the size of each tile (for example, "tile_width" and "tile_height"). Therefore, the CSP 130 can calculate the numbers of tiles cut in the horizontal direction and the vertical direction, respectively, according to the information about the size of the graphics target and the information about the size of each tile to determine the number of tiles for each frame and the coordinate position of each of the tiles in the entire rendering target.

Since the GPU 120 only needs to use a small buffer to store the rendering result of each tile after the rendering mode is switched to the second rendering mode and only needs to flush the pixel result of the visible area into the memory, the number of memory accesses during the graphics processing can be effectively reduced and the power consumption can be reduced by less memory accesses. In addition, since the tiles cover non-overlapping portions of the rendering target, the tiles can be rendered independently after being split by pixel coordinates. Therefore, the GPU 120 can also achieve higher three-dimensional graphics performance in the second rendering mode.

In some embodiments, in the second rendering mode, the CSP 130 may perform command parsing of the first drawing commands for each tile of each frame in sequence and may determine whether the command parsing of the first drawing commands is performed only once for some tiles according to the command type of each first drawing command. In an embodiment, the CSP 130 determines whether a first drawing command belongs to a two-dimensional drawing command. When the CSP 130 determines that the first drawing command belongs to a two-dimensional (2D) drawing command, the CSP 130 determines that the first drawing command is a predetermined drawing command. When the CSP 130 determines that the first drawing command does not belong to a two-dimensional drawing command, the CSP 130 determines that the first drawing command is a three-dimensional (3D) drawing command. When the CSP 130 determines that the first drawing command is a predetermined drawing command (i.e., a two-dimensional drawing command), the CSP 130 performs the command parsing of the first drawing commands only once for all the tiles of the current frame. Specifically, in the second rendering mode, the CSP 130 can receive all the drawing commands of a certain frame from the display driver 111 and can determine whether the drawing commands only needs to be parsed once according to the type of the drawing command. The CSP 130 determines whether the type of the drawing command is a general command or a specific command, and determines whether the command parsing of the subsequent tiles after the first tile can be skipped according to the determination result. In an embodiment, the type of drawing command can be divided into a three-dimensional drawing command and a two-dimensional drawing command, wherein the three-dimensional drawing command can be regarded as a general command, and the two-dimensional drawing command, such as a clear command, a copy command, etc., can be regarded as a specific command. For example, it is assumed that each frame is divided into 8 blocks #0~#7. When the drawing command is a general command (such as a three-dimensional drawing command), the CSP 130 performs the command parsing eight times on the general command to render 8 tiles #0~#7. When the drawing command is a specific command (such as a two-dimensional drawing command), the CSP 130 only performs the command parsing on a specific command once to render the first tile #0 and skips the command parsing on the next 7 tiles #1~#7. In an embodiment, the CSP 130 may add a special skip hint on the specific command after the first command parsing is performed, and then the CSP 130 may skip the command parsing of subsequent tiles according to the special skip hint.

In some embodiments, the CSP 130 may further perform mode switching between the two rendering modes according to the performance analysis results provided by the profiling unit 132. Specifically, the rendering mode includes at least the first rendering mode (the immediate rendering mode), and the second rendering mode (the tile rendering mode), wherein the mode switching includes the first rendering mode is switched to the second rendering mode, and the second rendering mode is switched to the first rendering mode.

FIG. 5 is a flow chart illustrating a graphics processing method according to another embodiment of the present invention. The graphics processing method is used to perform the mode switching between the first rendering mode and the second rendering mode according with the performance analysis results provided by the profiling unit 132 in FIG. 2. In the embodiment, it is assumed that the GPU 120 initially operates in the first rendering mode, wherein the first rendering mode is the immediate rendering mode and the second rendering mode is the tile rendering mode. In step S510, the CSP 130 in the GPU 120 calculates the drawing time of a plurality of consecutive frames (for example, five consecutive frames) and the number of objects in the consecutive frames (for example, five consecutive frames) for a certain application through the profiling unit 132. In step S520, the CSP 130 determines whether the calculated time and the number of objects in the consecutive frames are less than corresponding thresholds. Specifically, the CSP 130 determines whether the calculated drawing time of the consecutive frames is less than a predetermined time threshold and whether the number of graphics objects is less than a predetermined number threshold. When the drawing time of the consecutive frames is less than the predetermined time threshold and the number of objects is less than the predetermined number threshold, the CSP 130 determines that the drawing time of the consecutive frames and the number of objects in the consecutive frames are both less than their respective thresholds. Otherwise, the CSP 130 determines that the drawing time of the consecutive frames and the number of objects in the consecutive frames are not both less than their respective thresholds. When determining that the drawing time of the consecutive frames and the number of objects in the consecutive frames are not both less than their respective thresholds (No in step S520) (it means that the first rendering mode is maintained without being switched), the process returns to step S510 and the CSP 130 continues fetching the drawing time of the consecutive frames and the number of objects in the consecutive frames to determine whether the rendering mode needs to be switched.

When determining that the drawing time of the consecutive frames and the number of objects in the consecutive frames are both less than their respective thresholds (Yes in step S520), in step S530, the CSP 130 determines that the operation of the GPU 120 is switched from the first rendering mode to the second rendering mode. In the embodiment, the CSP 130 transmits a control signal (e.g., an interrupt signal) including a mode switching hint to the CPU 110 through the profiling unit 132, so that the CPU 110 switches the operation of the GPU 120 from the first rendering mode to the second rendering mode.

After the operation of the GPU 120 is switched from the first rendering mode to the second rendering mode, the CSP 130 calculates the memory traffic through the profiling unit 132 when drawing the consecutive frames in step S540. In step S550, the CSP 130 determines whether the memory traffic (for example, the number of read/writes of the memory) when drawing the consecutive frames is significantly reduced. Specifically, the CSP 130 determines whether the memory traffic when drawing the consecutive frames is significantly less than the previously stored/calculated memory traffic. For example, the CSP 130 determines whether the difference between the memory traffic when drawing consecutive frames and the previous memory traffic is greater than a predetermined threshold. When the CSP 130 determines that the difference between the memory traffic when drawing consecutive frames and the previous memory traffic is greater than the predetermined threshold, the CSP 130 determines that the memory traffic when drawing the consecutive frames is significantly reduced. Otherwise, the CSP 130 determines that the memory traffic when drawing the consecutive frames is not significantly reduced. For instance, the CSP 130 determines whether the memory traffic when drawing the consecutive frames is less than a half or a predetermined ratio of the previous memory traffic to determine whether the difference between the memory traffic when drawing the consecutive frames and the previous memory traffic is greater than a predetermined threshold.

When the CSP 130 determines that the memory traffic when drawing the consecutive frames is significantly reduced (YES in step S550) (it means that the rendering mode does not need to be switched and the GPU 120 maintains to be run in the second rendering mode), the process backs to step S540, and the CSP 130 obtains the memory traffic when drawing the consecutive frames and determines whether the rendering mode needs to be switched.

When the CSP 130 determines that the memory traffic when drawing the consecutive frames is not significantly reduced (NO in step S550) (it means that the performance is deteriorated), in step S560, the CSP 130 determines that the operation of the GPU 120 is switched from the second rendering mode to the first rendering mode. Then, the process returns to step S510, the CSP 130 re-obtain the drawing time of the consecutive frames and the number of objects in the consecutive frames, and determines whether the rendering mode needs to be switched. In the embodiment, the CSP 130 transmits the control signal including a mode switching hint (such as an interruption signal) to the CPU 110, so that the CPU 110 switches the operation of the GPU 120 from the second rendering mode back to the first rendering mode for subsequent graphics processing.

In summary, in the present invention provides a computer system, a GPU, and a graphics processing method thereof, providing a CSP supporting high performance requirements. The CSP can provide the GPU to support two different rendering modes at the same time, and can flexibly switch between the two different rendering modes according to the performance of the GPU, thereby speeding up the processing speed of the GPU to improve graphics performance and reduce overall power consumption.

Although the embodiment has been described as having specific elements in FIGS. 1 to 2, it should be noted that additional elements may be included to achieve better performance without departing from the spirit of the invention.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics processing unit (GPU), comprising:
a command stream parser (CSP), including a profiling unit used to provide performance statistics data for the GPU to determine a rendering mode of the GPU, wherein the rendering mode includes a first rendering mode and a second rendering mode for performing a graphics rendering pipeline for graphics processing,
wherein the profiling unit of the CSP calculates drawing time of a plurality of consecutive frames and the number of graphics objects in the consecutive frames for a specific application when the GPU operates in the first rendering mode, and determines whether the operation of the GPU is switched to the second rendering mode according to the calculated drawing time of the frames and the number of graphics objects in the frames; when determining that the calculated drawing time of the frames and the number of graphics objects in the frames are less than their respective thresholds, the CSP causes the operation of the GPU to switch from the first rendering mode to the second rendering mode,
wherein the profiling unit of the CSP calculates a memory flow of the consecutive frames after the operation of the GPU is switched from the first rendering mode to the second rendering mode; when a difference between the memory flow and a previous memory flow is greater than a predetermined threshold, the CSP maintains that the GPU operates in the second rendering mode; and when the difference between the memory flow and the previous memory flow is not greater than the predetermined threshold, the CSP switches to the first rendering mode from the second rendering mode such that the GPU operates in the second rendering mode.

2. The graphics processing unit (GPU) as claimed in claim 1, wherein the step of determining that the calculated drawing time of the frames and the number of graphics objects in the frames are less than their respective thresholds further comprising:
determining whether the drawing time of the frames is less than a predetermined time threshold and whether the number of graphics objects is less than a predetermined number threshold;
determining that the calculated drawing time of the frames and the number of graphics objects in the frames are less than their respective thresholds when determining that the drawing time of the frames is less than the predetermined time threshold and the number of graphics objects is less than the predetermined number threshold; and
determining that the calculated drawing time of the frames and the number of graphics objects in the frames are not less than their respective thresholds when determining that the drawing time of the frames is not less than the predetermined time threshold or the number of graphics objects is not less than the predetermined number threshold.

3. The graphics processing unit (GPU) as claimed in claim 1, wherein the profiling unit further transmits a control signal to a central processing unit (CPU) to cause the GPU to perform switching between the first rendering mode and the second rendering mode.

4. The graphics processing unit (GPU) as claimed in claim 1, wherein the first rendering mode is an immediate rendering mode (IMR mode) and the second rendering mode is a tile rendering mode (TBR mode).

5. A graphics processing method, used in the graphics processing unit (GPU), wherein the GPU comprises a command stream parser (CSP) having a profiling unit, and the GPU supporting a first rendering mode and a second rendering mode performs a graphics rendering pipeline for graphics processing, the method comprises:
operating the GPU to be run in the first rendering mode;
calculating drawing time of a plurality of consecutive frames and the number of graphics objects in the consecutive frames of a specific application by the profiling unit;

determining whether an operation of the GPU is switched to the second rendering mode according to the calculated drawing time of the frames and the number of graphics objects in the frames, wherein when determining that the calculated drawing time of the frames and the number of graphics objects in the frames are less than their respective thresholds, the operation of the GPU is switched from the first rendering mode to the second rendering mode;

calculating a memory flow of the consecutive frames by the profiling unit after the operation of the GPU is switched from the first rendering mode to the second rendering mode;

maintaining that the GPU operates in the second rendering mode when the difference between the memory flow and a previous memory flow is greater than a predetermined threshold; and switching to the first rendering mode from the second rendering mode such that the GPU operates in the second rendering mode when the difference between the memory flow and the previous memory flow is not greater than the predetermined threshold.

6. The graphics processing method as claimed in claim 5, wherein the step of determining that the calculated drawing time of the frames and the number of graphics objects in the frames are less than their respective thresholds further comprising:

determining whether the drawing time of the frames is less than a predetermined time threshold and whether the number of graphics objects is less than a predetermined number threshold;

determining that the calculated drawing time of the frames and the number of graphics objects in the frames are less than their respective thresholds when determining that the drawing time of the frames is less than the predetermined time threshold and the number of graphics objects is less than the predetermined number threshold; and determining that the calculated drawing time of the frames and the number of graphics objects in the frames are not less than their respective thresholds when determining that the drawing time of the frames is not less than the predetermined time threshold or the number of graphics objects is not less than the predetermined number threshold.

7. The graphics processing method as claimed in claim 5, wherein the profiling unit further transmits a control signal to a central processing unit (CPU) to cause the GPU to perform switching between the first rendering mode and the second rendering mode.

8. The graphics processing method as claimed in claim 5, wherein the first rendering mode is an immediate rendering mode (IMR mode) and the second rendering mode is a tile rendering mode (TBR mode).

9. A computer system, comprising:
a central processing unit (CPU), executing a display driver;
a graphics processing unit (GPU), performing a graphics rendering pipeline through a first rendering mode and a second rendering mode and at least comprising:
a command stream parser (CSP), including a profiling unit used to provide performance statistics data for the GPU to determine a rendering mode of the GPU,
wherein the profiling unit of the CSP calculates drawing time of a plurality of consecutive frames and the number of graphics objects in the consecutive frames of a specific application when the GPU operates in the first rendering mode, and determines whether the operation of the GPU is switched to the second rendering mode according to the calculated drawing time of the frames and the number of graphics objects in the frames; when determining that the calculated drawing time of the frames and the number of graphics objects in the frames are less than their respective thresholds, the CSP triggers the operation of the GPU to switch from the first rendering mode to the second rendering mode,
wherein the profiling unit of the CSP calculates a memory flow of the consecutive frames after the operation of the GPU is switched from the first rendering mode to the second rendering mode; when a difference between the memory flow and a previous memory flow is greater than a predetermined threshold, the CSP maintains that the GPU operates in the second rendering mode; and when the difference between the memory flow and the previous memory flow is not greater than the predetermined threshold, the CSP switches to the first rendering mode from the second rendering mode if the GPU operates in the second rendering mode.

* * * * *